(12) United States Patent
Suzuki et al.

(10) Patent No.: US 11,420,716 B2
(45) Date of Patent: Aug. 23, 2022

(54) VESSEL PROPULSION SYSTEM AND VESSEL INCLUDING THE SAME

(71) Applicant: YAMAHA HATSUDOKI KABUSHIKI KAISHA, Iwata (JP)

(72) Inventors: Takayoshi Suzuki, Shizuoka (JP); Akihiro Onoue, Shizuoka (JP); Satoshi Ishikawa, Shizuoka (JP); Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 56 days.

(21) Appl. No.: 16/551,770

(22) Filed: Aug. 27, 2019

(65) Prior Publication Data

US 2019/0382090 A1   Dec. 19, 2019

Related U.S. Application Data

(63) Continuation of application No. 15/810,233, filed on Nov. 13, 2017, now Pat. No. 10,435,127.

(30) Foreign Application Priority Data

Nov. 14, 2016   (JP) .............................. JP2016-221862

(51) Int. Cl.
*B63H 20/10* (2006.01)
*B63H 1/16* (2006.01)
*B63H 20/00* (2006.01)
*B63H 23/24* (2006.01)
*B63H 5/14* (2006.01)
*B63H 5/125* (2006.01)
*B63H 21/21* (2006.01)
(Continued)

(52) U.S. Cl.
CPC ............... *B63H 1/16* (2013.01); *B63H 5/125* (2013.01); *B63H 5/14* (2013.01); *B63H 20/007* (2013.01); *B63H 21/21* (2013.01); *B63H 23/24* (2013.01); *B63H 20/08* (2013.01); *B63H 21/17* (2013.01); *B63H 2001/165* (2013.01); *B63H 2021/216* (2013.01); *H02K 1/27* (2013.01); *Y02T 70/5236* (2013.01)

(58) Field of Classification Search
CPC ........ B63H 20/007; B63H 1/16; B63H 23/24; B63H 5/14; B63H 5/125
See application file for complete search history.

(56) References Cited

U.S. PATENT DOCUMENTS 5,017,165 A * 5/1991 Havins ...................... B63H 5/08
114/274
7,497,748 B2 * 3/2009 Salmon .................. B63B 39/061
114/285

OTHER PUBLICATIONS

Suzuki et al., "Vessel Propulsion System and Vessel Including the Same", U.S. Appl. No. 15/810,233, filed Nov. 13, 2017.

* cited by examiner

*Primary Examiner* — Andrew Polay
(74) *Attorney, Agent, or Firm* — Keating and Bennett, LLP

(57) ABSTRACT

A propulsion system for a vessel includes an engine propulsion unit that provides a propulsive force to a hull by using an engine as a power source, an electric propulsion unit that provides a propulsive force to the hull by using an electric motor as a power source, a storing mechanism that is displaced from an actuating position to actuate the electric propulsion unit to a storing position to store the electric propulsion unit and performs a storing operation to store the electric propulsion unit, and an interlock controller that interlocks a storing operation of the storing mechanism with (Continued)

generation of a propulsive force by the engine propulsion unit.

10 Claims, 10 Drawing Sheets

(51) Int. Cl.
*H02K 1/27* (2022.01)
*B63H 20/08* (2006.01)
*B63H 21/17* (2006.01)

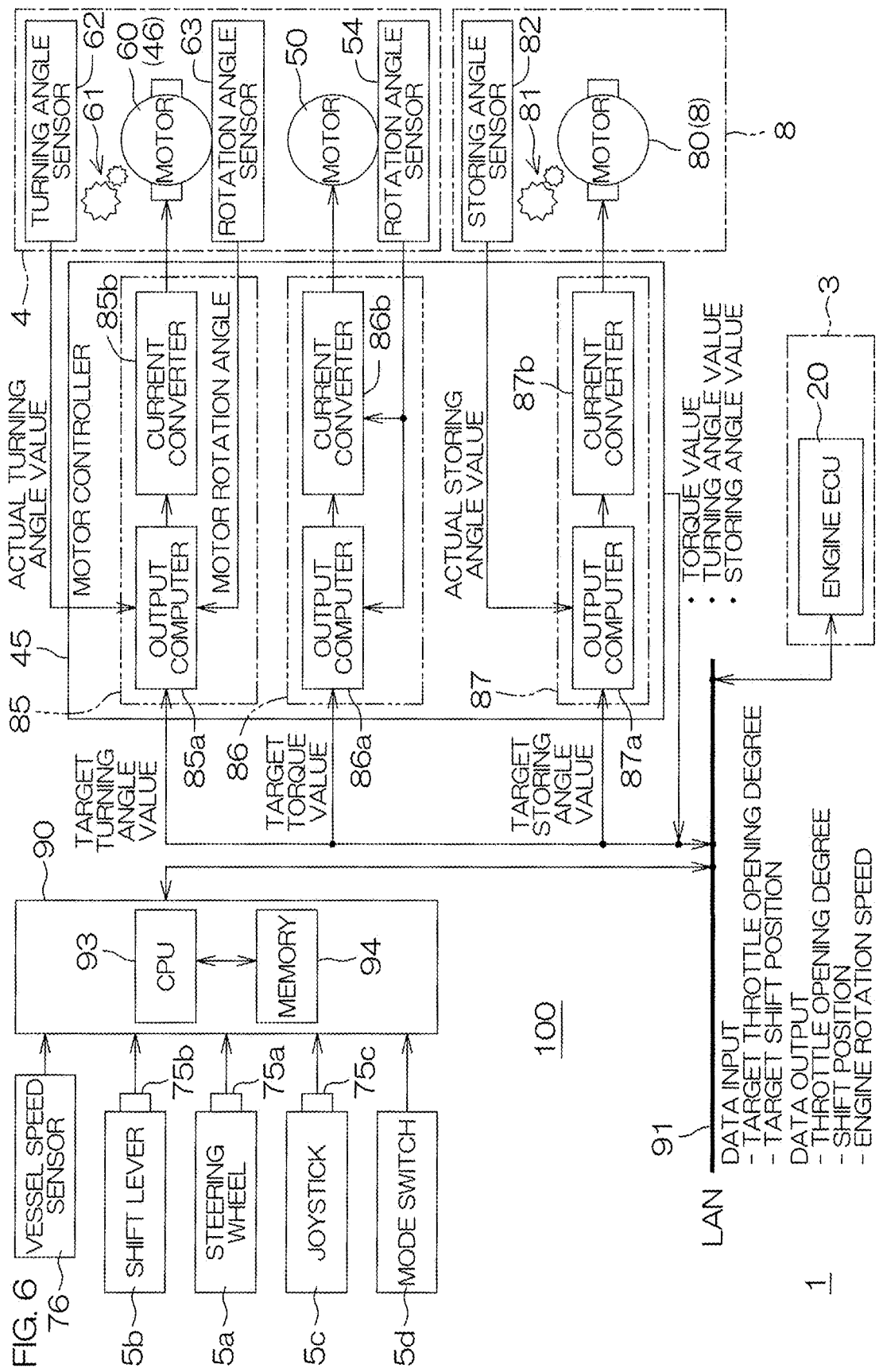

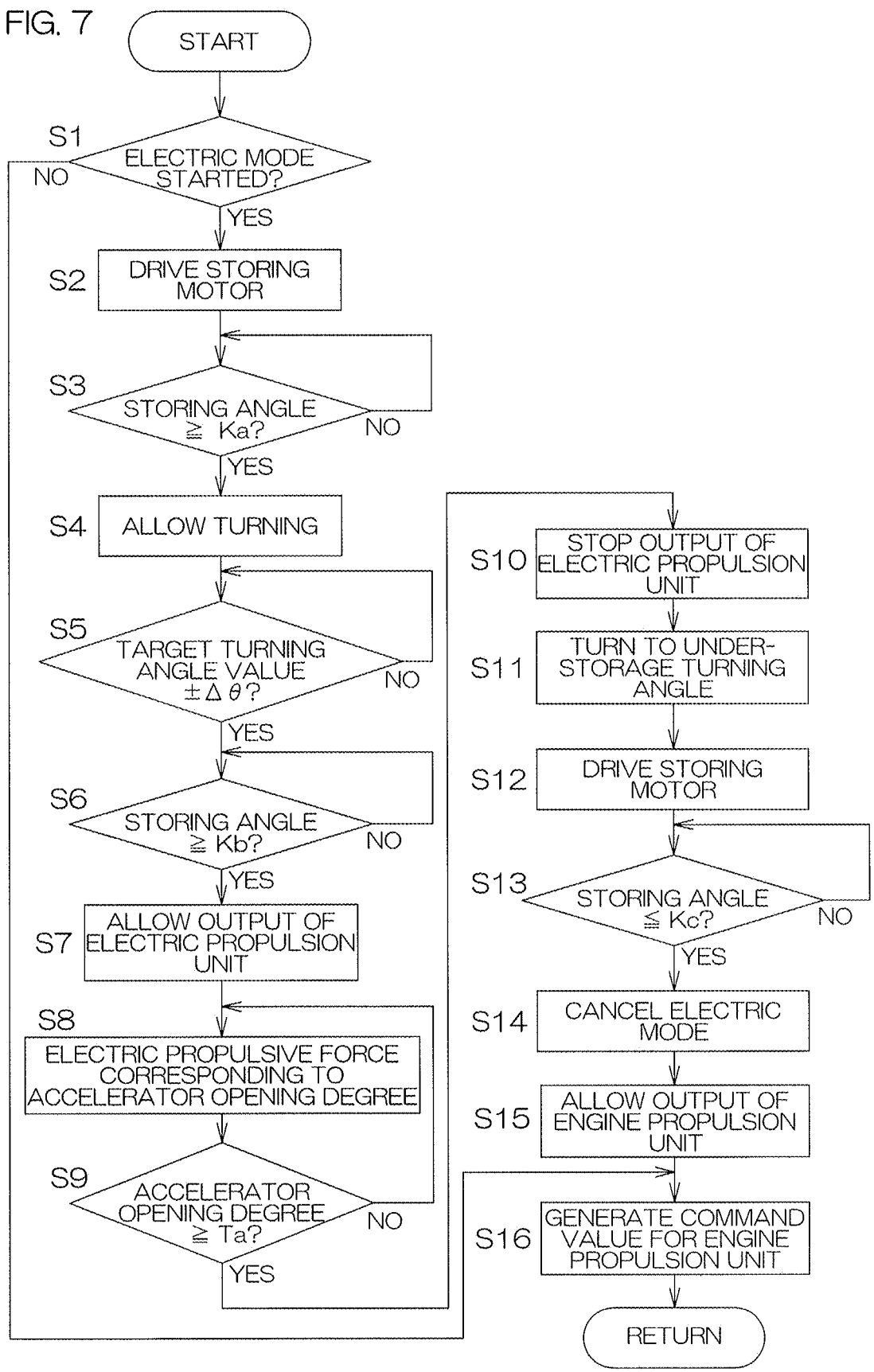

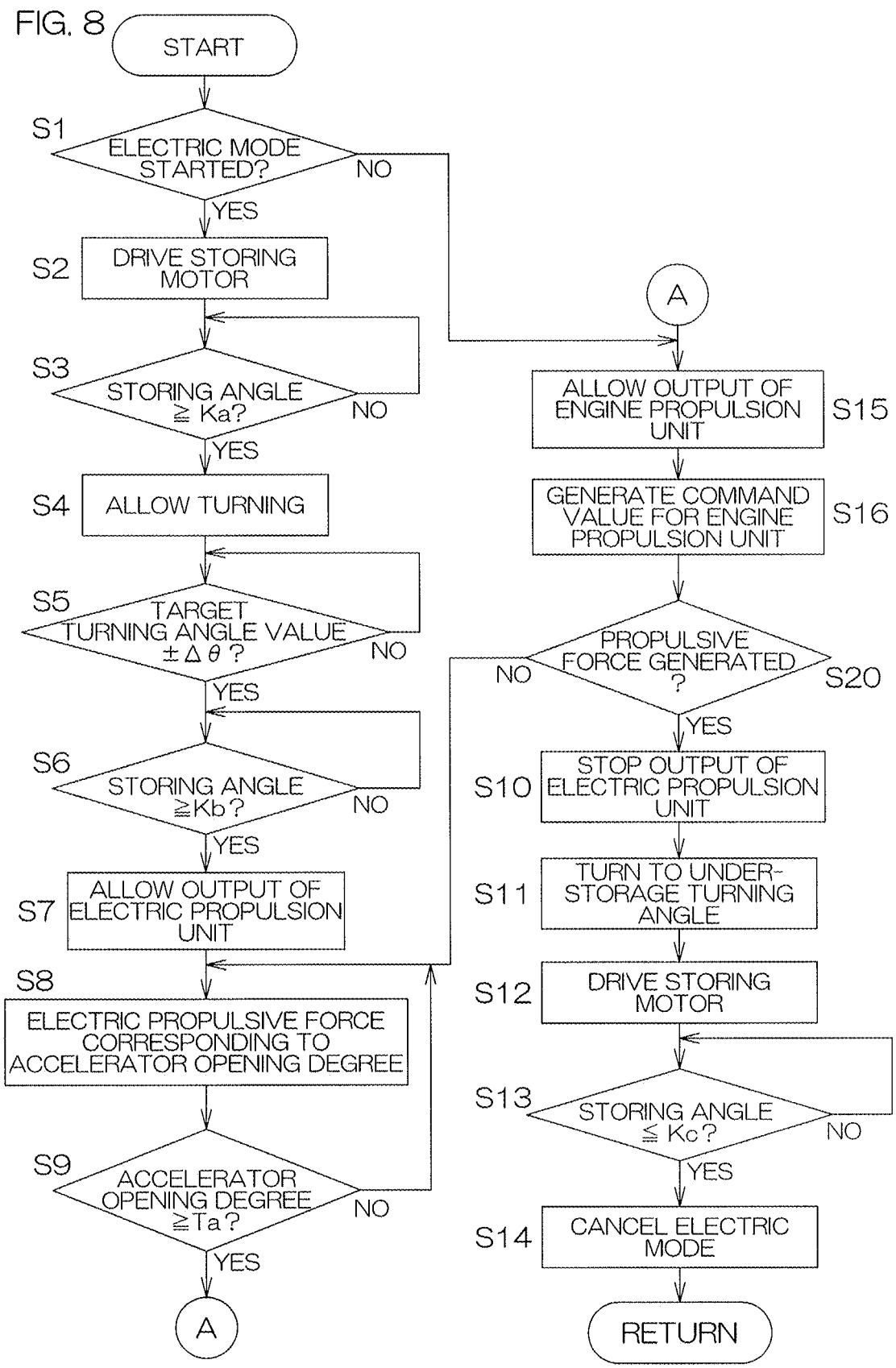

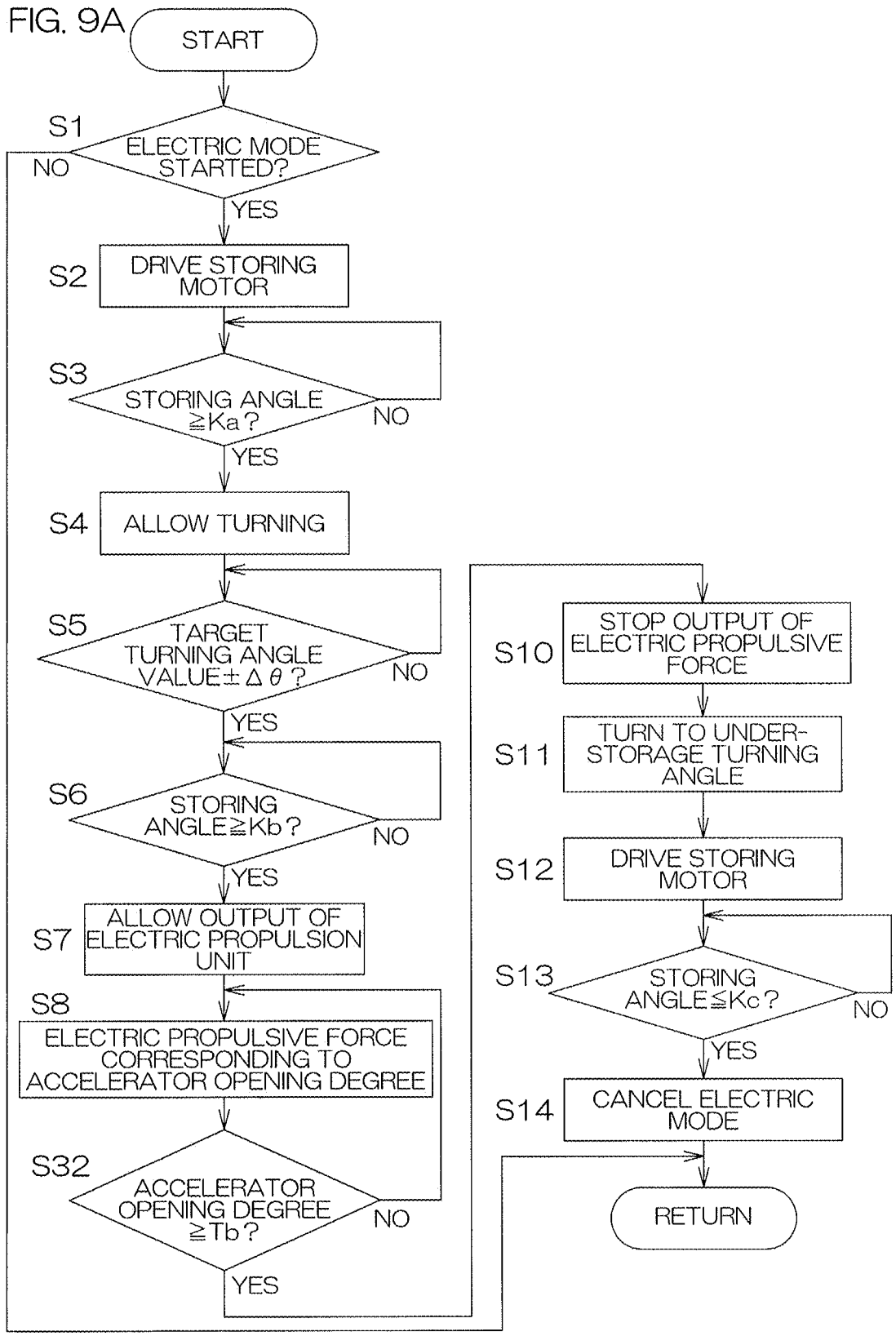

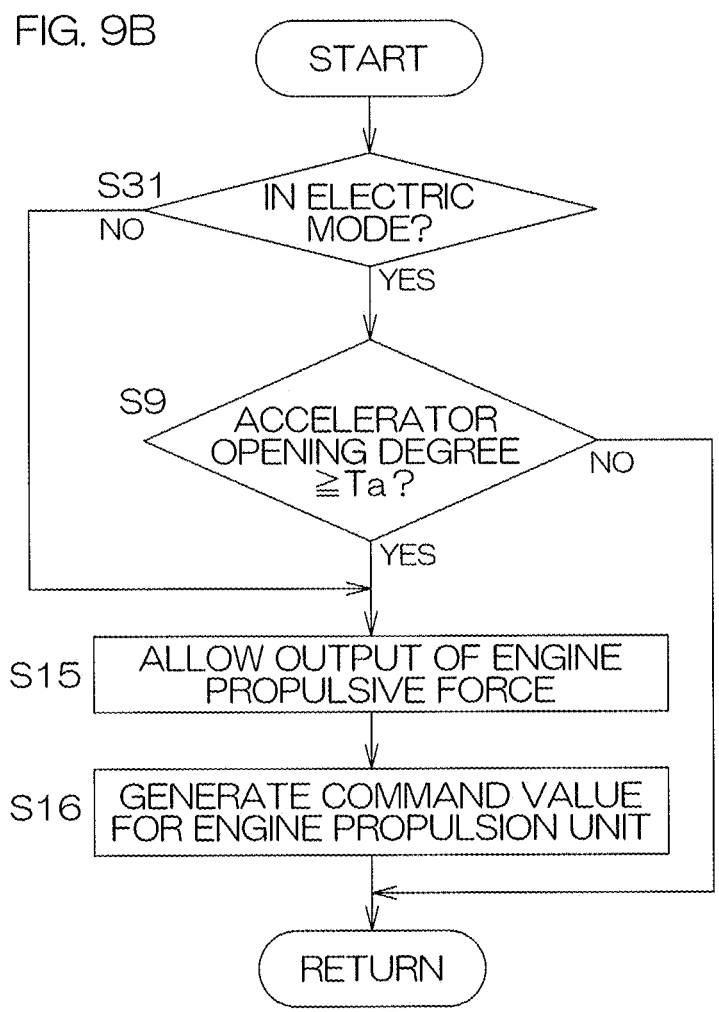

VESSEL PROPULSION SYSTEM AND VESSEL INCLUDING THE SAME

CROSS REFERENCE TO RELATED APPLICATIONS

This application claims the benefit of priority to Japanese Patent Application No. 2016-221862 filed on Nov. 14, 2016. The entire contents of this application are hereby incorporated herein by reference.

BACKGROUND OF THE INVENTION

1. Field of the Invention

The present invention relates to a vessel propulsion system including an electric propulsion unit and a vessel including such a vessel propulsion system.

2. Description of the Related Art

United States Patent Application Publication No. 2016/0185431 A1 discloses a vessel including an electric propulsion unit. An electric propulsion unit is a propulsion unit using an electric motor as a power source. As compared with an engine propulsion unit conventionally used, that is, a propulsion unit using an internal combustion as a power source, the electric propulsion unit produces little noise, and has excellent steering stability at the time of low-speed traveling.

SUMMARY OF THE INVENTION

The inventors of preferred embodiments of the present invention described and claimed in the present application conducted an extensive study and research regarding a vessel propulsion system, such as the one described above, and in doing so, discovered and first recognized new unique challenges and previously unrecognized possibilities for improvements as described in greater detail below.

A propulsive force generated by an electric propulsion unit does not always meet users' demands. For example, an output of the electric propulsion unit is not sufficient for high-speed traveling, and in this case, an engine propulsion unit is preferred.

Therefore, the inventors of the preferred embodiments of the present invention have studied an arrangement of a vessel including an engine propulsion unit in addition to an electric propulsion unit.

In a case in which both of an electric propulsion unit and an engine propulsion unit are equipped on a vessel, when the vessel travels by obtaining a propulsive force from the engine propulsion unit, and when the electric propulsion unit is in the water, the electric propulsion unit generates a resistance against traveling. Accordingly, fuel efficiency deteriorates and a traveling speed becomes low. Therefore, the inventors of preferred embodiments of the present invention considered providing a storing mechanism that stores the electric propulsion unit when it is not used. However, when using a propulsive force generated by the engine propulsion unit, if an operation to store the electric propulsion unit is left to a user, vessel operation becomes complicated. Therefore, the user may not store the electric propulsion unit. Therefore, even when the storing mechanism is provided, improvement in fuel efficiency and an excellent traveling speed when using an engine propulsion unit cannot be necessarily realized.

Preferred embodiments of the present invention provide vessel propulsion systems and vessels that solve the above problem.

In order to overcome the previously unrecognized and unsolved challenges described above, a preferred embodiment of the present invention provides a vessel propulsion system including an engine propulsion unit that provides a propulsive force to a hull by using an engine as a power source, an electric propulsion unit that provides a propulsive force to the hull by using an electric motor as a power source, a storing mechanism that performs a storing operation to move the electric propulsion unit from an actuating position to a storing position to store the electric propulsion unit, and an interlock controller configured or programmed to interlock the storing operation of the storing mechanism with generation of a propulsive force by the engine propulsion unit.

With this arrangement, even when a user does not perform a special operation to store the electric propulsion unit, generation of a propulsive force by the engine propulsion unit and storing of the electric propulsion unit are interlocked with each other. Accordingly, when the vessel is made to travel by a propulsive force of the engine propulsion unit, traveling resistance caused by an electric propulsion unit is significantly reduced or prevented. Accordingly, fuel efficiency is improved, and excellent traveling performance is obtained.

In a preferred embodiment of the present invention, in response to actuation of the storing mechanism to store the electric propulsion unit, the interlock controller allows generation of a propulsive force by the engine propulsion unit. Accordingly, when the vessel is made to travel by a propulsive force of the engine propulsion unit, traveling resistance caused by the electric propulsion unit is significantly reduced or prevented.

In a preferred embodiment of the present invention, when an accelerator operation amount, which is an operation amount of an accelerator that is operated by a vessel operator to adjust a propulsive force of the vessel, reaches a predetermined threshold or more, the interlock controller causes the storing mechanism to perform a storing operation.

Accordingly, when an accelerator operation amount reaches the predetermined threshold or more and a large propulsive force is needed, the electric propulsion unit is stored, and generation of a propulsive force by the engine propulsion unit is allowed. Therefore, a large propulsive force is generated by the engine propulsion unit to make the vessel travel, and at this time, traveling resistance caused by the electric propulsion unit is significantly reduced or prevented.

In a preferred embodiment of the present invention, in response to generation of a propulsive force by the engine propulsion unit, the interlock controller causes the storing mechanism to perform the storing operation. Accordingly, when the vessel is made to travel by a propulsive force from the engine propulsion unit, traveling resistance caused by the electric propulsion unit is significantly reduced or prevented.

In a preferred embodiment of the present invention, when an accelerator operation amount, which is an operation amount of an accelerator that is operated by a vessel operator to adjust a propulsive force of the vessel, reaches a predetermined threshold or more, the interlock controller allows generation of a propulsive force by the engine propulsion unit.

Accordingly, when the accelerator operation amount reaches or exceeds the predetermined threshold and a large propulsive force is needed, generation of a propulsive force by the engine propulsion unit is allowed. Then, when the engine propulsion unit generates a propulsive force, in response to this, the electric propulsion unit is stored. Therefore, a large propulsive force is generated by the engine propulsion unit to make the vessel travel, and at this time, traveling resistance caused by the electric propulsion unit is significantly reduced or prevented.

In a preferred embodiment of the present invention, the interlock controller causes the storing mechanism to perform the storing operation when an accelerator operation amount, which is an operation amount of an accelerator that is operated by a vessel operator to adjust a propulsive force of the vessel, reaches a predetermined storing threshold or more, and allows generation of a propulsive force by the engine propulsion unit when the accelerator operation amount reaches an engine propulsion threshold or more. Accordingly, when the accelerator operation amount is a large value and a large propulsive force is needed, the electric propulsion unit is stored, and generation of a propulsive force by the engine propulsion unit is allowed. Thus, based on the accelerator operation amount, storing of the electric propulsion unit and generation of a propulsive force by the engine propulsion unit are interlocked with each other. Therefore, when a large propulsive force is generated from the engine propulsion unit to make the vessel travel, traveling resistance caused by the electric propulsion unit is significantly reduced or prevented.

In a preferred embodiment of the present invention, the vessel propulsion system further includes a propulsion mode switch that switches between an engine propulsion allowing state in which generation of a propulsive force by the engine propulsion unit is allowed and an electric propulsion allowing state in which generation of a propulsive force by the electric propulsion unit is allowed. The propulsion mode switch may include a mode switch to be operated by a user.

In a preferred embodiment of the present invention, switching between the engine propulsion allowing state and the electric propulsion allowing state by the propulsion mode switch includes a transition state in which generation of a propulsive force by the engine propulsion unit is allowed and generation of a propulsive force by the electric propulsion unit is allowed. That is, in the transition state, both of the electric propulsion unit and the engine propulsion unit are allowed to generate propulsive forces.

In a preferred embodiment of the present invention, the engine propulsion unit includes the engine, a propulsive force generator, and a clutch disposed in a driving force transmission path from the engine to the propulsive force generator, and the interlock controller allows operation of the engine if the clutch is in a disengaged state when generation of a driving force by the engine propulsion unit is not allowed.

With this arrangement, in a clutch disengaged state, operation of the engine is allowed. Therefore, for example, when the engine propulsion unit is provided with a power generator, a battery is able to be charged by electric power generated by the power generator, and electric facilities on the vessel are able to be used.

A preferred embodiment of the present invention provides a vessel including a hull, and a vessel propulsion system including features described above provided on the hull. In this vessel, even when a user does not perform a special operation to store the electric propulsion unit, generation of a propulsive force by the engine propulsion unit and storing of the electric propulsion unit are interlocked with each other. Accordingly, when the vessel is made to travel by a propulsive force of the engine propulsion unit, traveling resistance caused by the electric propulsion unit is significantly reduced or prevented. Therefore, fuel efficiency is improved, and excellent traveling performance is obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a block diagram to describe an electrical configuration of the vessel.

FIG. 7 is a flowchart showing an example of a process in association with interlocking operation of a storing mechanism and propulsive force generation by the engine propulsion unit.

FIG. 8 is a diagram to describe a second preferred embodiment of the present invention, and is a flowchart showing an example of a process in association with an interlocking operation of a storing mechanism and propulsive force generation by an engine propulsion unit.

FIGS. 9A and 9B are diagrams to describe a third preferred embodiment of the present invention, and are flowcharts showing examples of processes in association with interlocking operation of a storing mechanism and propulsive force generation by an engine propulsion unit.

DETAILED DESCRIPTION OF THE PREFERRED EMBODIMENTS

Figure 1:
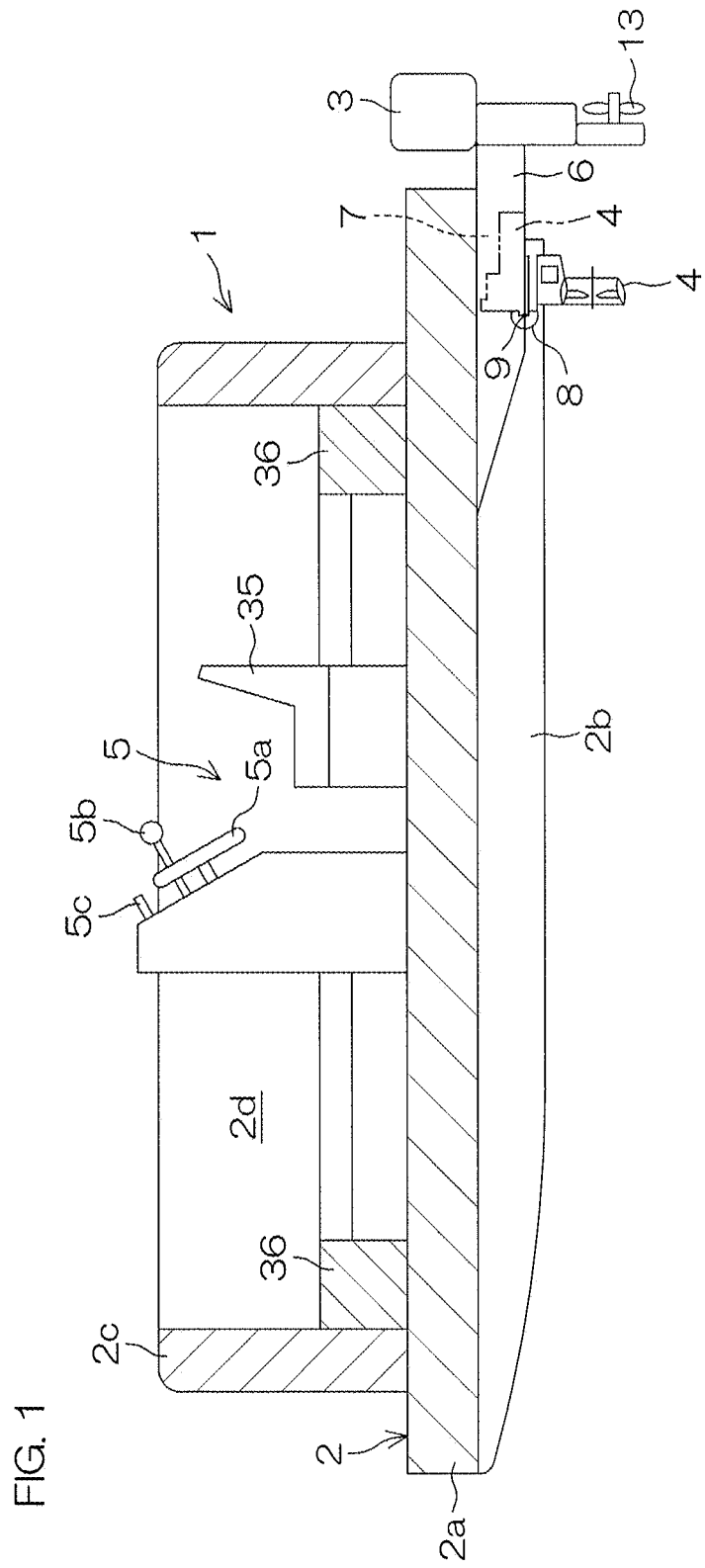
FIG. 1 is a schematic longitudinal sectional view to describe an example of a vessel according to a preferred embodiment of the present invention.
Figure 2:
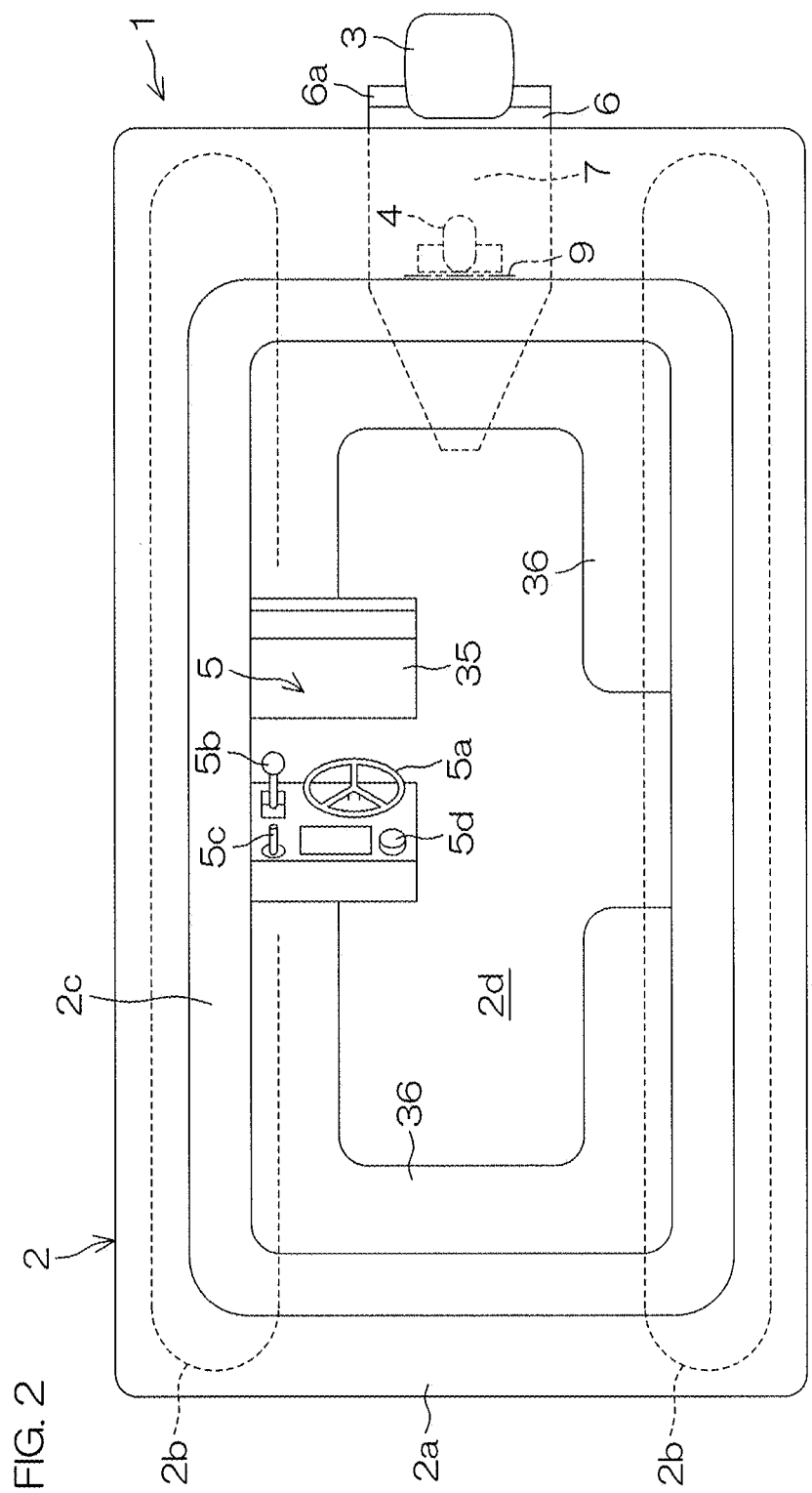
FIG. 2 is a schematic plan view of the vessel.

FIG. 1 is a schematic longitudinal sectional view to describe an example of a vessel 1 according to a preferred embodiment of the present invention, and FIG. 2 is a plan view of the same. The vessel 1 includes a hull 2, and an engine propulsion unit 3 and an electric propulsion unit 4 provided on the hull 2. This vessel 1 preferably is, for example, a so-called pontoon boat, and the hull 2 includes a deck 2a, a pair of floats 2b integral with a lower surface of the deck 2a, and a peripheral wall 2c that rises from an upper surface of the deck 2a and defines a cabin 2d. A cockpit 5 is disposed inside the cabin 2d. A steering wheel 5a, a shift lever 5b, and a joystick 5c, etc., are disposed in the cockpit 5. In the cockpit 5, a vessel operator seat 35 is disposed. A seat 36 for occupants is disposed inside the cabin 2d. The pontoon boat is just one example of the vessel, and preferred embodiments of the present invention is also applicable to vessels of other types and shapes.

The pair of floats 2b extend in the front-rear direction along lower surface right and left sides of the deck 2a. Between the pair of floats 2b, a propulsion unit attaching bracket 6 is fixed to a lower surface of the deck 2a. An engine propulsion unit 3 and an electric propulsion unit 4 are attached to the propulsion unit attaching bracket 6. The propulsion unit attaching bracket 6 extends in the front-rear direction of the hull 2, and a rear end of the bracket reaches a rear end portion of the deck 2a. An attaching plate 6a is provided at a rear end of the propulsion unit attaching bracket 6. The engine propulsion unit 3 is attached to the attaching plate 6a. The electric propulsion unit 4 is disposed ahead of the attaching plate 6a, and is attached to the propulsion unit attaching bracket 6 via a storing mechanism 8. The storing mechanism 8 rotationally moves the electric propulsion unit 4 around a storing rotational movement axis 9 extending in the right-left direction of the hull 2. Accordingly, the storing mechanism 8 is able to displace the electric propulsion unit 4 between a storing position (shown by a phantom line in FIG. 1) stored in a storing space 7 compartmented on an inner side of the propulsion unit attaching bracket 6, and an actuating position (shown by the solid line in FIG. 1) extending to the lower side of the deck 2a and projecting from the storing space 7.

Figure 3:
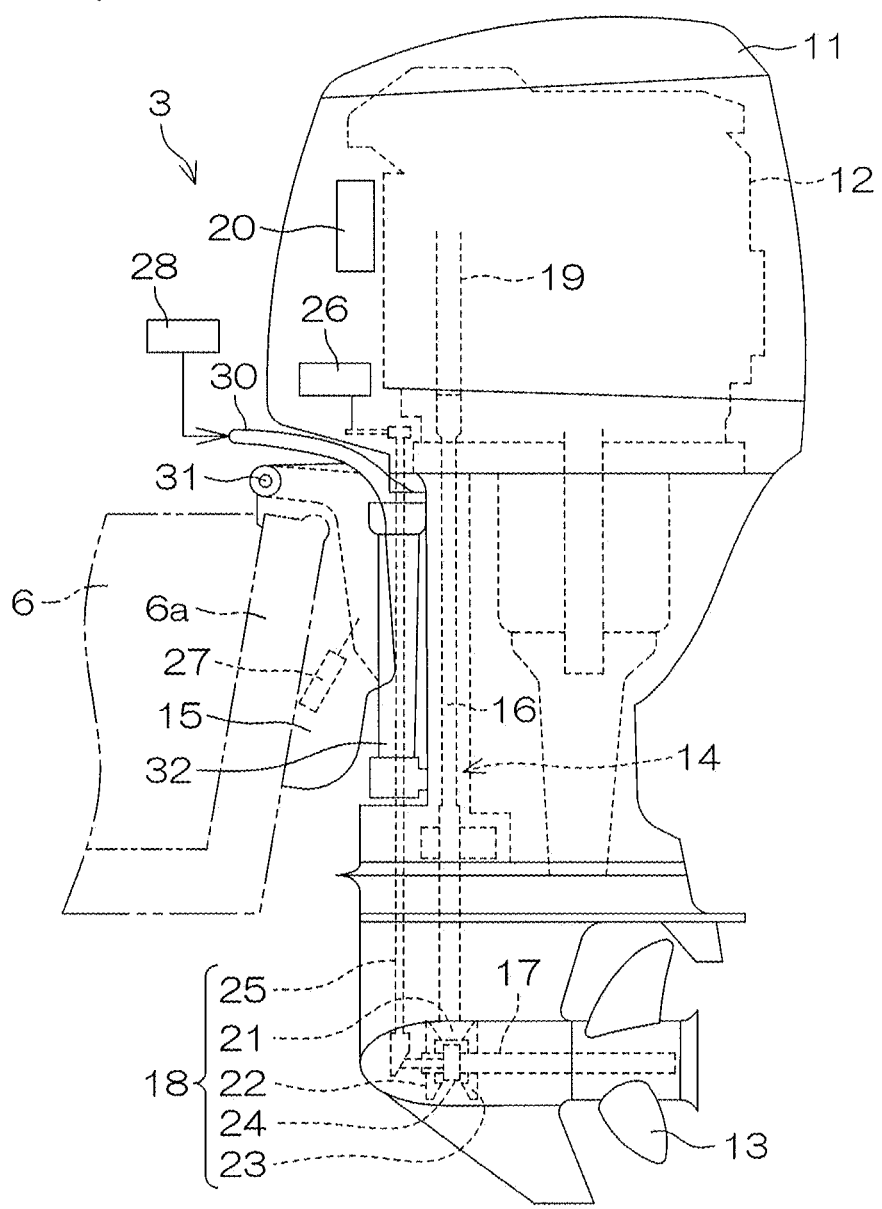
FIG. 3 is a schematic side view to describe an example of an engine propulsion unit.

FIG. 3 is a schematic side view used to describe an example of the engine propulsion unit 3. In the present preferred embodiment, the engine propulsion unit 3 is an internal combustion engine driven outboard motor. The engine propulsion unit 3 includes a cover 11, an engine 12, a propeller 13, a power transmission 14, and a bracket 15. The cover 11 houses the engine 12 and the power transmission 14. The engine 12 is disposed in an upper space inside the cover 11. The engine 12 is a power source that generates a propulsive force. The propeller 13 is driven to rotate by a driving force generated by the engine 12. The propeller 13 is disposed outside the cover 11 at a lower portion of the engine propulsion unit 3. The power transmission 14 transmits a driving force of the engine 12 to the propeller 13. The power transmission 14 includes a drive shaft 16, a propeller shaft 17, and a shift mechanism 18.

The drive shaft 16 is disposed along the up-down direction. The drive shaft 16 is joined to a crankshaft 19 of the engine 12, and transmits power generated by the engine 12. The propeller shaft 17 is disposed along the front-rear direction. The propeller shaft 17 is joined to a lower portion of the drive shaft 16 via the shift mechanism 18. The propeller shaft 17 transmits a driving force of the drive shaft 16 to the propeller 13.

The shift mechanism 18 switches a rotation direction of power to be transmitted from the drive shaft 16 to the propeller shaft 17. The shift mechanism 18 includes a pinion gear 21, a forward gear 22, a backward gear 23, and a dog clutch 24. The pinion gear 21 is fixed to a lower end of the drive shaft 16. The forward gear 22 and the backward gear 23 are disposed on the propeller shaft 17, and are rotatable relative to the propeller shaft 17. The pinion gear 21 engages with the forward gear 22 and the backward gear 23. The dog clutch 24 is spline-coupled to the propeller shaft 17, and disposed between the forward gear 22 and the backward gear 23. The dog clutch 24 is movable along the propeller shaft 17, and rotates together with the propeller shaft 17. The dog clutch 24 is movable to a forward position, a neutral position, and a backward position on the propeller shaft 17. The forward position is a position at which the dog clutch 24 engages with the forward gear 22, and does not engage with the backward gear 23. The backward position is a position at which the dog clutch 24 engages with the backward gear 23, and does not engage with the forward gear 22. The neutral position is a position at which the dog clutch 24 does not engage with any of the forward gear 22 and the backward gear 23, and is located between the forward position and the backward position. When the dog clutch 24 is at the forward position, rotation of the drive shaft 16 is transmitted to the propeller shaft 17 via the forward gear 22. Accordingly, the propeller 13 rotates in a forward-traveling rotation direction to generate a propulsive force to propel the hull 2 forward. When the dog clutch 24 is at the backward position, rotation of the drive shaft 16 is transmitted to the propeller shaft 17 via the backward gear 23. Accordingly, the propeller 13 rotates in a backward-traveling rotation direction to generate a propulsive force to propel the hull 2 backward. When the dog clutch 24 is at the neutral position, neither of rotations of the forward gear 22 and the backward gear 23 is transmitted to the propeller shaft 17. Therefore, no driving force is transmitted to the propeller 13.

The shift mechanism 18 further includes a shift rod 25 to move the dog clutch 24 along the propeller shaft 17. The shift rod 25 is driven by a shift actuator 26. Therefore, by controlling operation of the shift actuator 26, the dog clutch 24 is able to be controlled to any of the forward position, the neutral position, and the backward position. Hereinafter, a position of the dog clutch 24 may be referred to as "shift position." The dog clutch 24 is an example of a clutch that cuts-off/shuts-off a driving force transmission path from the engine 12 to the propeller 13.

The bracket 15 attaches the engine propulsion unit 3 to the hull 2, and is attached to the attaching plate 6a of the propulsion unit attaching bracket 6. The engine propulsion unit 3 is attached to the bracket 15 and is rotatable around a tilt shaft 31 and a turning shaft 32. The tilt shaft 31 extends in a width direction (horizontal direction) of the hull 2. The turning shaft 32 is perpendicular or substantially perpendicular to the tilt shaft 31, and extends substantially along the up-down direction in a state in which the engine propulsion unit 3 is used. A tilt trim actuator 27 rotationally moves the engine propulsion unit 3 around the tilt shaft 31. By rotationally moving the engine propulsion unit 3 around the tilt shaft 31, a trim angle of the engine propulsion unit 3 is changed. The trim angle corresponds to an attaching angle of the engine propulsion unit 3 to the hull 2.

A turning mechanism 30 changes a direction of a propulsive force to be generated by the engine propulsion unit 3 to the rightward or leftward direction of the hull 2. The turning mechanism 30 rotationally moves the engine propulsion unit 3 around the turning shaft 32. The turning mechanism 30 includes a turning actuator 28 as a power source. By rotationally moving the engine propulsion unit 3 around the turning shaft 32 by the turning mechanism 30, a turning angle is changed. The turning angle is an angle (angle of direction) that a propulsive force of the engine propulsion unit 3 makes with respect to the front-rear direction of the hull 2.

Figure 4:
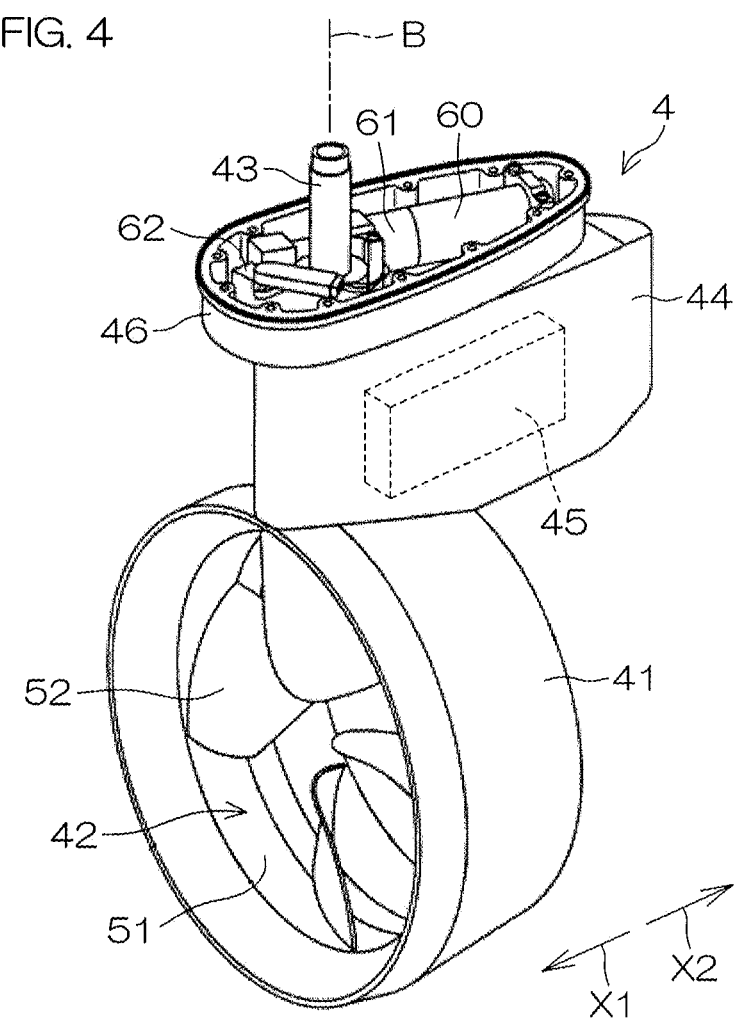
FIG. 4 is a perspective view to describe an example of an electric propulsion unit.
Figure 5:
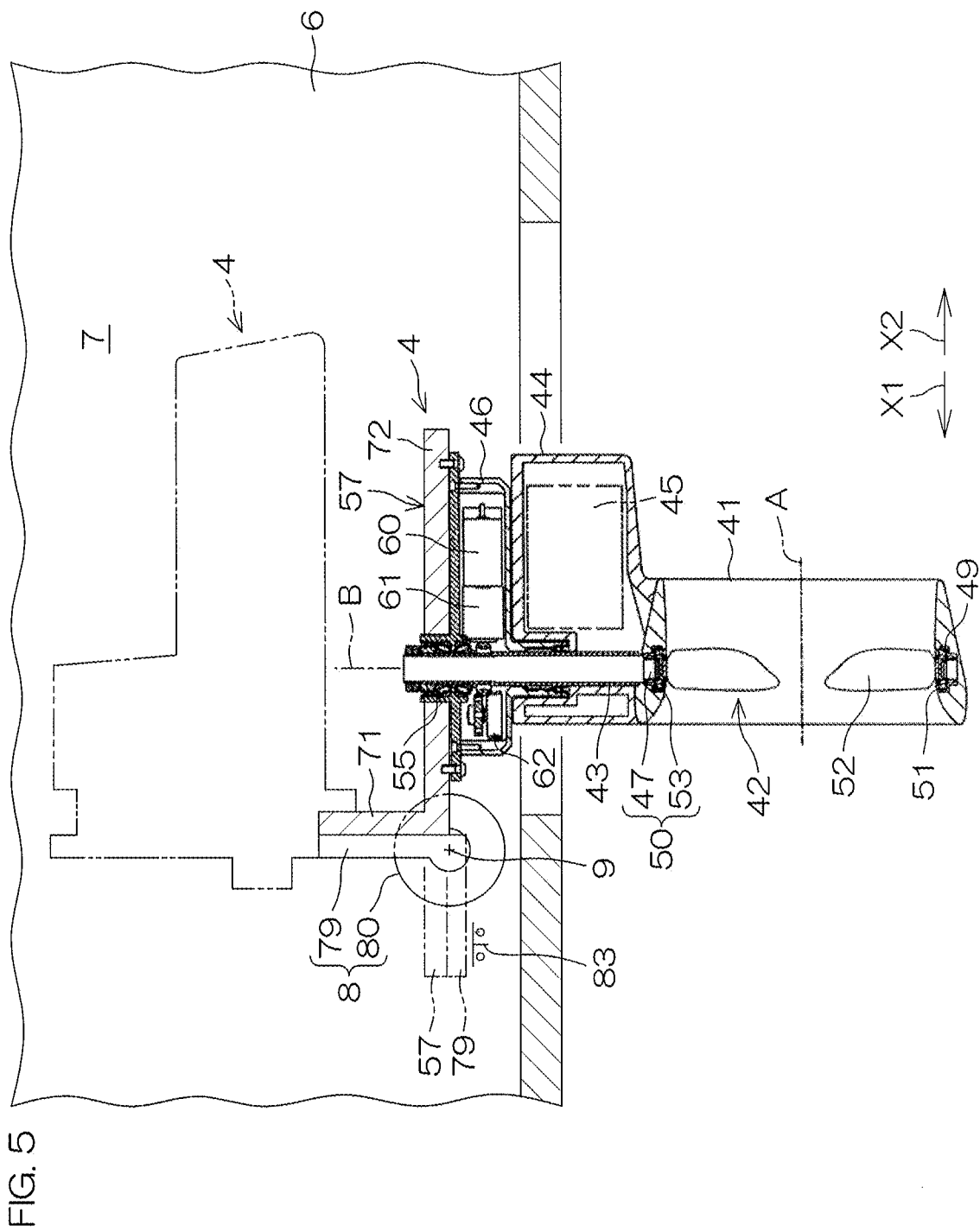
FIG. 5 is a longitudinal sectional view of the electric propulsion unit.

FIG. 4 is a perspective view to describe an example of the electric propulsion unit, and FIG. 5 is a longitudinal sectional view of the same. The electric propulsion unit 4 includes a cylindrical duct 41, a propeller 42, a steering shaft 43, a casing 44, a motor controller 45, and a turning mechanism 46. The duct 41 includes a stator 47. The propeller 42 includes a rim 51 and blades 52. The rim 51 includes a rotor 53. The stator 47 and the rotor 53 face each other, and these elements define an electric motor 50 (switched reluctance motor). That is, by applying a current to the stator 47, the rotor 53 rotates around a rotation axis A. As the electric motor 50, other than a switched reluctance motor (SR motor), a permanent magnet motor or a stepping motor may be used.

The duct 41 is a rotary body in which the rotation axis A is an axis of rotation, and its cross section in a plane including the rotation axis A is wing-shaped. That is, the cross section has a shape that is round at a front edge and pointed at a rear edge. An inner diameter (radius of an inner circumferential surface) of the duct 41 decreases toward the rear side in a region in front of the blades 52, and is almost uniform in a region from the blades 52 to the rear edge. An outer diameter (radius of an outer circumferential surface) of the duct 41 is almost uniform in the region in front of the blades 52, and decreases toward the rear side in the region from the blades 52 to the rear edge.

On the inner circumferential surface of the duct 41, a circumferential recess recessed radially outward is provided. The rim 51 is housed in this recess. More specifically, the rim 51 is supported rotatably by the duct 41 via a fluid bearing 49 provided along the recess of the duct 41.

On the outer circumference of the recess of the duct 41, the stator 47 is disposed. The stator 47 includes coils. The stator 47 generates a magnetic field when electric power is supplied to the coils. A plurality of coils are disposed circumferentially along the recess of the duct 41. Electric power is respectively supplied to the plurality of coils in synchronization with rotation. Accordingly, a magnetic force of the stator 47 is applied to the rotor 53 of the propeller 42, and accordingly, the propeller 42 is rotated.

The blades 52 of the propeller 42 are located on the inner side of the ring-shaped rim 51, and radially outer edges of the blades are fixed to an inner circumferential surface of the rim 51. That is, the blades 52 project inward in the radial direction of the rim 51 from the inner circumferential surface of the rim 51. For example, four blades 52 are provided at even intervals (of about 90 degrees) along the circumferential direction. The blades 52 are preferably wing-shaped.

The rotor 53 is provided on the outer side of the rim 51. The rotor 53 is disposed at a position facing the stator 47 of the duct 41. More specifically, the rotor 53 and the stator 47 face each other at a predetermined distance in the radial direction. That is, the electric motor 50 including the stator 47 and the rotor 53 preferably is a radial gap type motor, for example. In the rotor 53, a portion with high magnetic permeability and a portion with low magnetic permeability are alternately disposed circumferentially. That is, in the rotor 53, a reluctance torque is generated by a magnetic force generated from the stator 47. Accordingly, the rotor 53 (rim 51) is rotated.

The steering shaft 43 turnably supports the duct 41. More specifically, the steering shaft 43 is supported rotatably by the turning mechanism 46 via a tapered roller bearing 55. The steering shaft 43 supports, via the tapered roller bearing 55, the casing 44 which is integral with the duct 41. The motor controller 45 is housed in the casing 44. The steering shaft 43 preferably has a hollow shape. Inside the hollow shape of the steering shaft 43, wiring that supplies electric power to the stator 47, wiring to connect the motor controller 45 and a battery (not shown) equipped in the hull 2, wiring to connect an inboard LAN (Local Area Network) 91 (refer to FIG. 6) and the motor controller 45, and wiring to connect the motor controller 45 and the turning mechanism 46, etc., are housed.

In the present preferred embodiment, the casing 44 is fixed to the duct 41 and turns together with the duct 41. More specifically, the casing 44 is integral with the duct 41. The casing 44 preferably has a streamlined shape along the rotation axis A of the propeller 42. More specifically, the casing 44 preferably has a streamlined shape so that its resistance to water relatively flowing in the direction X along the rotation axis A is small. In greater detail, the duct 41 and the casing 44 are preferably wing-shaped in cross section. Therefore, the duct 41 and the casing 44 generate a propulsive force by a wing effect when a water flow in a direction X2 from the front edge to the rear edge of the duct 41 is generated. On the other hand, the duct 41 and the casing 44, when a water flow in a reverse direction X1 is generated, hardly generate a propulsive force attributable to this water flow. This causes a difference between a propulsive force in the direction X1 (forward-traveling direction) generated by rotating the portion 42 forward and a propulsive force in the direction X2 (backward-traveling direction) generated by reversely rotating the propeller 42 even though the rotation speed is the same. That is, the propulsive force in the direction X1 (forward-traveling direction) is larger.

The turning mechanism 46 is disposed above the duct 41, and turns the duct 41. The turning mechanism 46 includes an electric motor 60, a reducer 61, and a turning angle sensor 62. The electric motor 60 of the turning mechanism 46 is driven based on a command from a controller 90 (refer to FIG. 6). The electric motor 60 is driven to rotate when supplied with electric power from a battery (not shown) equipped in the hull 2 via a driver. The electric motor 60 rotates the steering shaft 43 around a turning axis B via the reducer 61. The turning angle sensor 62 detects a rotational movement angle of the steering shaft 43 as a turning angle. Based on a detected turning angle, the electric motor 60 is feedback-controlled.

FIG. 5 also shows an examples of the structure that attaches the electric propulsion unit 4 to the hull 2. An upper surface of the turning mechanism 46 is fixed to the bracket 57. Accordingly, the electric propulsion unit 4 is supported by the bracket 57.

The bracket 57 is attached to the propulsion unit attaching bracket 6 via the storing mechanism 8 that moves rotationally around a storing rotational movement axis 9 extending in the right-left direction of the hull 2. More specifically, the storing mechanism 8 includes a drive bracket 79 (a movable portion), and an electric motor 80 that rotationally moves the drive bracket 79 around the storing rotational movement axis 9. The bracket 57 includes a hull attachment 71 and a propulsion unit attachment 72. The hull attachment 71 is coupled to the drive bracket 79 of the storing mechanism 8, and is arranged so that a driving force from the storing mechanism 8 is transmitted to the hull attachment 71. The propulsion unit attachment 72 defines a predetermined angle with respect to the hull attachment 71 and is integral with the hull attachment 71. The propulsion unit attachment 72 preferably has a tabular or substantially tubular shape. The upper surface of the turning mechanism 46 is fixed to the propulsion unit attachment 72.

The storing mechanism 8 rotationally moves (displaces) the drive bracket 57 around the storing rotational movement axis 9 between an actuating position shown by the solid line and a storing position shown by the phantom line. Accordingly, the electric propulsion unit 4 rotationally moves around the storing rotational movement axis 9, and is displaced between the actuating position shown by the solid line and the storing position shown by the phantom line. The storing position is a position at which the electric propulsion unit 4 is stored in a storing space 7 inside the propulsion unit attaching bracket 6.

FIG. 6 is a block diagram to describe an electrical configuration of the vessel. The vessel 1 includes the controller 90. The controller 90, the engine propulsion unit 3, the electric propulsion unit 4, and the storing mechanism 8 define a vessel propulsion system 100 according to a preferred embodiment of the present invention. Input signals from the steering wheel 5a, the shift lever 5b, the joystick 5c, and the mode switch 5d are input into the controller 90. More specifically, in relation to the steering wheel 5a, an operation angle sensor 75a that detects an operation angle of the steering wheel 5a is provided. In addition, in relation to the shift lever 5b, an accelerator opening degree sensor 75b including a position sensor that detects an operation position (operation amount) of the shift lever 5b is provided. Further, in relation to the joystick 5c, a joystick position sensor 75c including a position sensor that detects an operation position of the joystick 5c is provided. Detection signals of these sensors 75a, 75b, and 75c and an output signal of the mode switch 5d are input into the controller 90. An output signal of a vessel speed sensor 76 that detects a vessel speed of the vessel 1 is input to the controller 90. The controller 90 is an example of an interlock controller in a preferred embodiment of the present invention.

The controller 90 is connected to the inboard LAN 91. The turning mechanism 46 of the electric propulsion unit 4 includes, as described above, an electric motor 60 (hereinafter, referred to as a "turning motor 60") as a drive source. The storing mechanism 8 includes an electric motor 80 (hereinafter, referred to as "storing motor 80") as a drive source. An electric motor 50 (hereinafter, referred to as "propulsion motor 50") that rotationally drives the propeller 42, the turning motor 60, and the storing motor 80 are actuated by a drive current supplied from the motor controller 45. The motor controller 45 is connected to the inboard LAN 91. The controller 90 communicates with the motor controller 45 via the inboard LAN 91, and provides a drive command value to the motor controller 45. To the inboard LAN 91, a controller of the engine propulsion unit 3, that is, an engine ECU (Electronic Control Unit) 20 is further connected.

The motor controller 45 includes a turning motor controller 85 to drive the turning motor 60, a propulsion motor controller 86 to drive the propulsion motor 50, and a storing motor controller 87 to drive the storing motor 80.

The turning motor controller 85 includes an output computer 85a and a current converter 85b. Into the output computer 85a, a target turning angle value, an actual turning angle value, and a motor rotation angle are input. The target turning angle value is output from the controller 90 via the inboard LAN 91. The actual turning angle value is detected by the turning angle sensor 62 equipped in the turning mechanism 30. The motor rotation angle is detected by a rotation angle sensor 63 attached to the turning motor 60. The rotation angle sensor 63 detects a rotation angle of a rotor of the turning motor 60. The output computer 85a generates an output torque value based on a deviation between the target turning angle value and the actual turning angle value, and a motor rotation angle detected by the rotation angle sensor 63, and supplies the output torque value to the current converter 85b. The current converter 85b supplies a drive current corresponding to the output torque value to the turning motor 60. Thus, the turning motor 60 is driven. The turning motor 60 is accordingly feedback-controlled so that the actual turning angle approaches the target turning angle value.

The propulsion motor controller 86 includes an output computer 86a and a current converter 86b. Into the output computer 86a, a target torque value is input, and a motor rotation angle is input. The target torque value is output from the controller 90 via the inboard LAN 91. The motor rotation angle is detected by the rotation angle sensor 54 attached to the propulsion motor 50. The rotation angle sensor 54 detects a rotation angle of a rotor portion 53 of the propulsion motor 50. Instead of a rotation angle sensor 54, it is also possible that a rotation angle of the propulsion motor 50 is obtained by internal computing by the motor controller 45. The output computer 86a generates an output torque value based on the target torque value and the motor rotation angle, and supplies the output torque value to the current converter 86b. The current converter 86b supplies a drive current corresponding to the output torque value to the propulsion motor 50, and thus, the propulsion motor 50 is driven. Accordingly, the propulsion motor 50 is controlled so that the target torque value is reached, and accordingly, a propulsive force satisfying the requested output is obtained.

The storing motor controller 87 includes an output computer 87a and a current converter 87b. Into the output computer 87a, a target storing angle value and an actual storing angle value are input. The target storing angle value is output from the controller 90 via the inboard LAN 91. The actual storing angle value is detected by a storing angle sensor 82 equipped in the storing mechanism 8. The storing angle sensor 82 detects an angle of a movable portion of the storing mechanism 8. The storing angle corresponds to an elevation angle (or depression angle) of the electric propulsion unit 4. For example, the storing angle may be about 90 degrees, for example, at the actuating position, and may be about 0 degrees, for example, at the storing position. Rotation of the storing motor 80 may be transmitted to the movable portion (drive bracket 79) via a reducer 81. In this case, the storing angle sensor 82 may detect a rotation angle of any of rotary shafts (including a motor shaft) disposed in a rotation transmission path from the storing motor 80 to the movable portion. The output computer 87a generates an output torque value based on a deviation between the target storing angle value and the actual storing angle value, and supplies the output torque value to the current converter 87b. The current converter 87b supplies a drive current corresponding to the output torque value to the storing motor 80, and the storing motor 80 is accordingly driven. Thus, the storing motor 80 is feedback-controlled so that the actual storing angle value approaches the target storing angle value, and accordingly, the electric propulsion unit 4 is displaced between the storing position and the actuating position.

The motor controller 45 transmits the output torque value, the actual turning angle value, and the storing angle value operated by the output computers 85a, 86a, and 87a to the controller 90 via the inboard LAN 91.

The engine ECU 20 is equipped in the engine propulsion unit 3. Command information such as a target throttle opening degree and a target shift position is output from the controller 90 via the inboard LAN 91 to the engine ECU 20. The engine ECU 20 controls a throttle opening degree of the engine 12 based on the target throttle opening degree, and accordingly controls an output of the engine 12 (engine rotation speed). The engine ECU 20 controls the shift actuator 26 based on the target shift position. Accordingly, the shift mechanism 18 is moved to a shift position (the forward position, the neutral position, or the backward position) corresponding to the target shift position. The engine ECU 20 transmits an actual throttle opening degree, an actual shift position, and an actual engine rotation speed to the controller 90 via the inboard LAN 91.

Into the controller 90, shift lever position information (an output of the accelerator opening degree sensor 75b) showing an operation position of the shift lever 5b is input. The shift lever 5b is a shift position selecting operator to be operated by an operator to select a shift position. In the present preferred embodiment, the shift lever 5b functions also as an accelerator (accelerator operating portion, accelerator lever) to be operated by an operator to set an accelerator opening degree (accelerator operation amount). An operation amount of the shift lever 5b is detected by the accelerator opening degree sensor 75b. Therefore, the controller 90 interprets output signals of the accelerator opening degree sensor 75b as shift lever position information and accelerator opening degree information.

Operation angle information of the steering wheel 5a (an output of the operation angle sensor 75a) is input to the controller 90.

Operation position information of the joystick 5c (an output of the joystick position sensor 75c) is also input into the controller 90. The joystick 5c is an example of an accelerator (accelerator operator, accelerator lever). An operation position of the joystick 5c is detected by the joystick position sensor 75c. The controller 90 interprets output signals of the joystick position sensor 75c as a steering command signal and an accelerator command signal (accelerator opening degree), etc.

Further, mode command information is input from the mode switch 5d to the controller 90. The mode switch 5d is operated by an operator. By operating the mode switch 5d, an operator is able to select an electric mode in which the electric propulsion unit 4 is used, an engine-only mode in which the electric propulsion unit 4 is not used, and an automatic mode in which switching between the electric mode and the engine-only mode is left to the controller 90.

The mode switch 5d defines at least a portion of a propulsion mode switching unit that switches between an engine propulsion allowing state in which generation of a propulsive force by the engine propulsion unit 3 is allowed, and an electric propulsion allowing state in which generation of a propulsive force by the electric propulsion unit 4 is allowed. The electric mode corresponds to the electric propulsion allowing state, and the engine-only mode corresponds to the engine propulsion allowing state. In the automatic mode, due to an action by the controller 90, the electric propulsion allowing state and the engine propulsion allowing state are selected. In the electric mode, the controller 90 cancels the electric mode and puts the state into the engine propulsion allowing state as necessary. Thus, an action of the controller 90 also defines the propulsion mode switching unit. The electric propulsion allowing state and the engine propulsion allowing state do not necessarily have to be selected alternatively. For example, when canceling the electric mode, the controller 90 may temporarily allow both of the electric propulsion unit 4 and the engine propulsion unit 3 to generate propulsive forces. That is, when switching between the electric propulsion allowing state and the engine propulsion allowing state, the state may be changed to a transition state in which both of the propulsion units 3 and 4 are allowed to generate propulsive forces.

Various pieces of information are further input from the inboard LAN 91 to the controller 90. More specifically, as information related to the electric propulsion unit 4, an output torque value, an actual turning angle value, and an actual storing angle value, etc., are input. As information related to the engine propulsion unit 3, an actual throttle opening degree, an engine rotation speed, etc., are input.

The controller 90 outputs, as described above, target turning angle values, target torque values, and target storing angle values in relation to the electric propulsion unit 4. The controller 90 outputs a target throttle opening degree and a target shift position related to the engine propulsion unit 3.

In a preferred embodiment of the present invention, the controller 90 is configured or programmed to perform an interlock operation of the storing mechanism 8 with generation of a propulsive force by the engine propulsion unit 3. The controller 90 includes a CPU (Central Processing Unit) 93, and a memory 94 storing programs to be executed by the CPU 93. When the CPU 93 executes the programs, the controller 90 performs functions as a plurality of function processors. One of these functions is an interlock controller that interlocks operation of the storing mechanism 8 and generation of a propulsive force by the engine propulsion unit 3.

FIG. 7 is a flowchart showing a detailed example of interlocking operation of the storing mechanism 8 and propulsive force generation by the engine propulsion unit 3, and shows a processing example to be repeatedly performed by the controller 90.

The controller 90 judges whether the electric mode has been started (Step S1). When an electric mode starting condition is met, the controller 90 starts the electric mode. The electric mode starting condition may be met by, for example, at least one of the following Conditions A1 and A2. Instead of Condition A2, the following Condition A3 may be used.

Condition A1: The electric mode has been selected by the mode switch 5d.

Condition A2: The automatic mode is selected by the mode switch 5d, the shift lever 5b is at the neutral position, and the vessel speed has decreased to reach a predetermined value (for example, about 5 km/h) or less.

Condition A3: The automatic mode is selected by the mode switch 5d, the shift lever 5b is at the neutral position, the vessel speed is at a predetermined value (for example, about 5 km/h) or less, and the joystick 5c has been operated.

The electric mode is ended when a predetermined canceling condition is met. The canceling condition may be met by, for example, at least one of the following Conditions B1, B2, B3, and B4.

Condition B1: The engine-only mode has been selected by the mode switch 5d.

Condition B2: The automatic mode is selected by the mode switch 5d, and the shift lever 5b has been moved from the neutral position to another position. That is, shifting-in (propulsive force generation) of the engine propulsion unit 3 has been commanded.

Condition B3: The automatic mode is selected by the mode switch 5d, and the shift lever 5b has been moved by a predetermined angle (for example, about 10 degrees) or more in an operation direction to increase the output from a state in which the shift lever 5b is in a range of a predetermined angle (for example, within about ±20 degrees) from the neutral position. That is, an operation intended to shift-in of the engine propulsion unit 3 (propulsive force generation) has been detected.

Condition B4: The automatic mode is selected by the mode switch 5d, and it has been detected that the shift lever 5b is in a moving state for a predetermined period of time (for example, about 0.5 seconds) or more at an operation speed equal to or more than a predetermined speed (for example, about 30 deg/sec). That is, an operation intended to generate a large propulsive force has been detected.

When the state is out of the electric mode, the electric propulsion unit 4 is at the storing position. When the electric mode is started (Step S1: YES), the controller 90 drives the storing motor 80 to move the electric propulsion unit 4 to the actuating position (Step S2). For the convenience of storing in the storing space 7 inside the propulsion unit attaching bracket 6, the electric propulsion unit 4 may be turned so that its turning angle reaches an under-storage turning angle in the stored state. In this case, the controller 90 performs an operation to change the turning angle of the electric propulsion unit 4 to a target turning angle value, that is, a command value commanded by the steering wheel 5a or the joystick 5c. More specifically, first, the controller 90 stands-by until the storing angle reaches a predetermined turning start allowing angle Ka or more, and when it reaches the turning start allowing angle (Step S3: YES), the controller allows turning (Step S4). Accordingly, the controller 90 actuates the turning motor 60 to start turning to the target turning angle value. The turning start allowing angle Ka is a storing angle set in advance to prevent the electric propulsion unit 4 from interfering (colliding) with other elements of the vessel 1 when turning.

When the actual turning angle value enters a predetermined angle range (for example, a target turning angle value ±Δθ, Δθ is a constant) around the target turning angle value (Step S5: YES), and the storing angle reaches a predetermined actuation starting angle Kb (Kb>Ka) (Step S6: YES), the controller 90 allows driving of the propulsion motor (Step S7). The actuation starting angle Kb is a storing angle in a state in which the electric propulsion unit 4 has sufficiently approached the actuating position without posing a problem even when it generates a propulsive force.

After allowing driving of the propulsion motor 50, the controller 90 outputs a target torque value for the propulsion motor 50 according to an accelerator opening degree (Step S8). According to this target torque value, the propulsion motor 50 is driven. Specifically, the accelerator opening degree is a value corresponding to a position of the shift lever 5b or a position of the joystick 5c, and is an accelerator command corresponding to an operator's input.

The controller 90 further judges whether the accelerator opening degree is equal to or more than a predetermined engine propulsion threshold Ta. When the accelerator opening degree is less than the engine propulsion threshold Ta (Step S9: NO), the process returns to Step S8, a target torque value corresponding to the accelerator opening degree is set and the propulsion motor 50 is driven, and a corresponding propulsive force is generated from the electric propulsion unit 4.

When the accelerator opening degree is equal to or more than the engine propulsion threshold Ta (Step S9: YES), and a large propulsive force is accordingly requested, a process to generate a propulsive force by the engine propulsion unit 3 is performed. That is, the controller 90 stops the output of the electric propulsion unit 4 (Step S10), and turns the electric propulsion unit 4 to the under-storage turning angle (step S11). Further, in order to move the electric propulsion unit 4 to the storing position, the controller 90 issues a command to drive the storing motor 80 (Step S12). Then, the controller 90 checks whether storing of the electric propulsion unit 4 has been completed (Step S13). For example, by judging whether the storing angle is equal to or less than a predetermined storage determining angle Kc, the controller 90 may check whether the electric propulsion unit 4 has reached a position sufficiently close to the storing position. Alternatively, the controller may detect completion of storing of the electric propulsion unit 4 by a detection switch 83 (refer to FIG. 5, for example, a micro switch) actuated by the movable portion of the storing mechanism 8 in a storing state.

When storing of the electric propulsion unit 4 is completed (Step S13: YES), the controller 90 cancels the electric mode (Step S14), and allows generation of a propulsive force by the engine propulsion unit 3 (Step S15). Then, the controller 90 provides command values of a target throttle opening degree, a target shift position, and a target turning angle, etc., to the engine ECU 20 (Step S16). By setting the target shift position to the forward position or the backward position, in the engine propulsion unit 3, a driving force of the engine 12 is transmitted to the propeller 13, and a propulsive force is generated from the engine propulsion unit 3. At this time, the electric propulsion unit 4 is located at the storing position, so that little or no traveling resistance is generated.

Thus, according to a preferred embodiment of the present invention, even without a special operation by a user to store the electric propulsion unit 4, generation of a propulsive force by the engine propulsion unit 3 and storing of the electric propulsion unit 4 are interlocked with each other. Accordingly, when the vessel 1 travels by a propulsive force of the engine propulsion unit 3, traveling resistance caused by the electric propulsion unit 4 is significantly reduced or prevented. Accordingly, fuel efficiency is improved and excellent traveling performance is obtained.

In addition, in a preferred embodiment of the present invention, when the accelerator opening degree reaches the engine propulsion threshold Ta or more, the storing motor 80 is driven, the electric propulsion unit 4 is stored, and generation of a propulsive force by the engine propulsion unit 3 is allowed. Therefore, a large propulsive force is generated by the engine propulsion unit 3 to make the vessel 1 travel, and at this time, traveling resistance caused by the electric propulsion unit 4 is significantly reduced or prevented.

In a preferred embodiment of the present invention, by operating the mode switch 5d, a user is able to select whether he/she uses the electric mode. Accordingly, a user is able to select use of the electric propulsion unit 4 at his/her own will.

In a preferred embodiment of the present invention, even when generation of a propulsive force by the engine propulsion unit 3 is not allowed, operation of the engine 12 is allowed. Therefore, when the engine propulsion unit 3 is provided with a power generator, by operating the engine 12, a battery (not shown) equipped in the hull 2 is charged and electric facilities (not shown) equipped in the vessel 1 are able to be used.

FIG. 8 is a diagram to describe a second preferred embodiment of the present invention, and is a flowchart showing an example of a process to be repeatedly performed by the controller 90 in association with interlocking operation of the storing mechanism 8 and propulsive force generation by the engine propulsion unit 3. In the description of the present preferred embodiment, FIG. 1 to FIG. 6 described above are referred to again. In FIG. 8, steps in which substantially the same process as in each step shown in FIG. 7 described above is performed are designated by the same reference signs.

In the present preferred embodiment, when the accelerator opening degree reaches the engine propulsion threshold Ta or more in the electric mode (Steps S8 and S9), prior to stopping the output of the electric propulsion unit 4 (Step S10) and storing of the electric propulsion unit 4 (Steps S11 to S13), and cancellation of the electric mode (Step S14), output (generation of a propulsive force) of the engine propulsion unit 3, are allowed (Step S15). Then, the controller 90 provides various commands to the engine ECU 20 of the engine propulsion unit 3 (Step S16). In this state, the controller 90 judges whether the engine propulsion unit 3 has generated a propulsive force (Step S20). For example, when the shift position is at the forward position or the backward position, and the engine rotation speed or the throttle opening degree is equal to or more than a predetermined threshold, the controller 90 may judge that the engine propulsion unit 3 has generated a propulsive force. When the engine propulsive device 3 generates no propulsive force (Step S20: NO), the process returns to Step S8, and generation of a propulsive force by the electric propulsion unit 4 is continuously allowed. On the other hand, when the engine propulsion unit 3 generates a propulsive force (Step S20: YES), the controller 90 stops the propulsion motor 50 of the electric propulsion unit 4 (Step S10), and further drives the storing motor 80, etc., to store the electric propulsion unit 4 (Steps S11 to S13). Then, the controller 90 cancels the electric mode (Step S14) and ends the process.

Thus, in the present preferred embodiment, when the engine propulsion unit 3 actually generates a propulsive force, in response to this, the electric propulsion unit 4 is stored. Therefore, in a state in which the engine propulsion unit 3 generates a propulsive force, an operation to store the electric propulsion unit 4 is performed. The engine propulsion unit 3 and the electric propulsion unit 4 may be temporarily put into a transition state in which both of these generate propulsive forces.

FIGS. 9A and 9B are diagrams to describe a third preferred embodiment of the present invention, and are flowcharts showing examples of processes of the controller 90 in association with interlocking operation of the storing mechanism 8 and propulsive force generation by the engine propulsion unit 3. The controller 90 repeatedly performs in parallel a control process for the electric propulsion unit 4 shown in FIG. 9A and a control process for the engine propulsion unit 3 shown in FIG. 9B. In FIGS. 9A and 9B, steps in which substantially the same process as in each step shown in FIG. 7 described above is performed are designated by the same reference signs.

In the first preferred embodiment shown in FIG. 7 described above, after the electric propulsion unit 4 is stored, output (generation of a propulsive force) by the engine propulsion unit 3 is allowed. In the second preferred embodiment shown in FIG. 8, when output (generation of a propulsive force) of the engine propulsion unit 3 starts, the electric propulsion unit 4 is stored. On the other hand, in the third preferred embodiment, when the accelerator opening degree reaches a storing threshold Tb or more (Step S32: YES), the electric propulsion unit 4 is stored (Steps S11 to S13). On the other hand, when the accelerator opening degree reaches the engine propulsion threshold Ta or more (Step S9: YES), output of the engine propulsion unit 3 is allowed (Step S15). More specifically, as shown in FIG. 9A, when the accelerator opening degree reaches the storing threshold Tb or more (Step S32), the controller 90 stops output of the electric propulsion unit 4 (Step S10), stores the electric propulsion unit 4 (Steps S11 to S13), and cancels the electric mode (Step S14). In parallel with this operation, in the electric mode (Step S31: YES), when the accelerator opening degree reaches the engine propulsion threshold Ta or more (Step S9: YES), the controller 90 allows output (generation of a propulsive force) by the engine propulsion unit 3 (Step S15). Then, the controller 90 generates a command value for the engine propulsion unit 3 (Step S16). When the state is not the electric mode (Step S31: NO), the controller 90 allows output of the engine propulsion unit 3 (Step S15), and generates a command value for the engine propulsion unit 3 (Step S16). Therefore, a propulsive force is generated by the engine propulsion unit 3. In the electric mode (Step S31: YES), when the accelerator opening degree is less than the engine propulsion threshold Ta (Step S32: NO), the process is ended without allowing output of the engine propulsion unit 3.

Thus, in the present preferred embodiment, storing of the electric propulsion unit 4 and allowing output of the engine propulsion unit 3 are performed according to the accelerator opening degree, so that storing of the electric propulsion unit 4 and propulsive force generation by the engine propulsion unit 3 are interlocked with each other.

The storing threshold Tb may be equal to or different from the engine propulsion threshold Ta. The storing threshold Tb may be larger than the engine propulsion threshold Ta, or may be smaller than the engine propulsion threshold Ta.

Various preferred embodiments of the present invention have been described above, and the present invention can be further carried out by other preferred embodiments.

For example, in the preferred embodiments described above, the engine propulsion unit 3 is an outboard motor; however, it may be another type of propulsion unit such as an inboard motor, an inboard-outdrive engine (stern drive), etc.

In the preferred embodiments described above, the storing mechanism 8 preferably stores the electric propulsion unit 4 in the storing space 7 by displacing the electric propulsion unit 4, and accordingly reduces traveling resistance caused by the electric propulsion unit 4. However, storing of the electric propulsion unit 4 does not necessarily have to involve displacement of the electric propulsion unit 4. For example, a storing mechanism structured to reduce traveling resistance caused by the electric propulsion unit 4 by disposing a streamline-shaped cover at the front side of the electric propulsion unit 4, may be used. In this case, the cover is preferably displaced between a storing position at which the cover is disposed at the front side of the electric propulsion unit 4 to put the electric propulsion unit 4 into a stored state, and an actuating position at which the cover is retracted from the front side of the electric propulsion unit 4 to put the electric propulsion unit 4 into an actuated state.

Further, in the preferred embodiments described above, by operating the mode switch 5d, the electric mode and the engine-only mode are able to be manually selected, and the automatic mode is able be selected. However, it is also possible that the mode switch 5d is not provided and only the automatic mode is provided. To the contrary, it is also possible that the automatic mode is not provided, and the electric mode and the engine-only mode are selected by the mode switch 5d.

When traveling in shallow water using the electric propulsion unit 4, the tilt trim actuator 27 of the engine propulsion unit 3 may be actuated to put the engine propulsion unit 3 into a tilted-up state.

The storing mechanism 8 is preferably arranged so that in a case of collision with an obstacle in the water, the electric propulsion unit 4 is flipped up to the storing position by an impact of the collision. Accordingly, breakage of the electric propulsion unit 4 is avoided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A propulsion system for a vessel comprising:
an engine propulsion unit that provides a propulsive force to a hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and a controller programmed to allow, in response to actuation of the motor to store the electric propulsion unit, generation of the propulsive force by the engine propulsion unit; wherein when an accelerator operation amount, which is an operation amount of an accelerator that is operated by a vessel operator to adjust a propulsive force of the vessel, reaches a predetermined threshold or more, the controller is programmed to cause the motor to perform the storing operation.

2. A propulsion system for a vessel comprising:
an engine propulsion unit that provides a propulsive force to a hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to cause the motor to perform the storing operation in response to generation of a propulsive force by the engine propulsion unit.

3. The vessel propulsion system according to claim 2, wherein, when an accelerator operation amount, which is an operation amount of an accelerator that is operated by a vessel operator to adjust a propulsive force of the vessel, reaches a predetermined threshold or more, the controller is programmed to allow generation of the propulsive force by the engine propulsion unit.

4. A propulsion system for a vessel comprising:
an engine propulsion unit that provides a propulsive force to a hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to cause the motor to perform the storing operation when an accelerator operation amount, which is an operation amount of an accelerator that is operated by a vessel operator to adjust a propulsive force of the vessel, reaches a predetermined storing threshold or more, and to allow generation of the propulsive force by the engine propulsion unit when the accelerator operation amount reaches an engine propulsion threshold or more.

5. A vessel comprising:
a hull; and
a vessel propulsion system on the hull, the vessel propulsion system including:
an engine propulsion unit that provides a propulsive force to the hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to allow, in response to actuation of the motor to store the electric propulsion unit, generation of the propulsive force by the engine propulsion unit; wherein
when an accelerator operation amount, which is an operation amount of an accelerator that is operated by a vessel operator to adjust a propulsive force of the vessel, reaches a predetermined threshold or more, the controller is programmed to cause the motor to perform the storing operation.

6. A vessel comprising:
a hull; and
a vessel propulsion system on the hull, the vessel propulsion system including:
an engine propulsion unit that provides a propulsive force to the hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to cause the motor to perform the storing operation in response to generation of the propulsive force by the engine propulsion unit.

7. The vessel according to claim 6, wherein, when an accelerator operation amount, which is an operation amount of an accelerator that is operated by a vessel operator to adjust a propulsive force of the vessel, reaches a predetermined threshold or more, the controller is programmed to allow generation of the propulsive force by the engine propulsion unit.

8. A vessel comprising:
a hull; and
a vessel propulsion system on the hull, the vessel propulsion system including:
an engine propulsion unit that provides a propulsive force to the hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to cause the motor to perform the storing operation when an accelerator operation amount, which is an operation amount of an accelerator that is operated by a vessel operator to adjust a propulsive force of the vessel, reaches a predetermined storing threshold or more, and to allow generation of the propulsive force by the engine propulsion unit when the accelerator operation amount reaches an engine propulsion threshold or more.

9. A propulsion system for a vessel comprising:
an engine propulsion unit that provides a propulsive force to a hull by using an engine as a power source;
an electric propulsion unit that provides a propulsive force to the hull by using an electric motor as a power source;
a motor that performs a storing operation to move the electric propulsion unit from an actuating position to a storing position to store the electric propulsion unit; and
a controller programmed to cause the motor to perform the storing operation when an accelerator operation amount, which is an operation amount of an accelerator that is operated by a vessel operator to adjust a propulsive force of the vessel, reaches a predetermined threshold or more.

10. A vessel comprising:

a hull; and a vessel propulsion system on the hull, the vessel propulsion system including:

an engine propulsion unit that provides a propulsive force to the hull by using an engine as a power source;

an electric propulsion unit that provides a propulsive force to the hull by using an electric motor as a power source;

a motor that performs a storing operation to move the electric propulsion unit from an actuating position to a storing position to store the electric propulsion unit; and a controller programmed to cause the motor to perform the storing operation when an accelerator operation amount, which is an operation amount of an accelerator that is operated by a vessel operator to adjust a propulsive force of the vessel, reaches a predetermined threshold or more.

* * * * *